United States Patent [19]

Perry et al.

[11] Patent Number: 4,699,642
[45] Date of Patent: Oct. 13, 1987

[54] PURIFICATION OF CARBON DIOXIDE FOR USE IN BREWING

[75] Inventors: Edward J. Perry; Anthony R. Coleman, both of Epsom, United Kingdom

[73] Assignee: Kims Developments Limited, London, England

[21] Appl. No.: 836,646

[22] Filed: Mar. 5, 1986

[30] Foreign Application Priority Data

Mar. 5, 1985 [GB] United Kingdom ............... 8505689

[51] Int. Cl.⁴ .................................................. F25J 1/00
[52] U.S. Cl. ............................................ 62/541; 62/17; 62/40; 62/41; 99/277
[58] Field of Search ................ 62/11, 17, 18, 38, 39, 62/40, 41, 541; 99/277, 323.1; 426/11

[56] References Cited

U.S. PATENT DOCUMENTS 3,240,025  3/1966  Malick et al. .................. 62/541 X
3,448,587  6/1969  Goard et al. .................... 62/541 X
4,112,829  9/1976  Painsard et al. .................... 99/277

Primary Examiner—Albert J. Makay
Assistant Examiner—Steven E. Warner
Attorney, Agent, or Firm—Birch, Stewart, Kolasch & Birch

[57] ABSTRACT

A process is disclosed for producing substantially pure liquid carbon dioxide, and subsequently re-evaporating the substantially pure liquid carbon dioxide to produce substantially pure gaseous carbon dioxide from impure carbon dioxide gas which is produced during the fermentation step of a brewing process or has been used as an overgas in a brewing plant, the substantially pure gaseous carbon dioxide being for use in carbonating the brewed product or as an overgas in the brewing plant. The process comprises the steps of:
(a) removing impure carbon dioxide gas from the brewing plant;
(b) pressurizing the impure carbon dioxide gas.

The present invention also provides an apparatus for carrying out the process.

14 Claims, 6 Drawing Figures

PURIFICATION OF CARBON DIOXIDE FOR USE IN BREWING

FIELD OF THE INVENTION

The present invention relates to the purification of carbon dioxide for use in brewing and, in particular, to a process in which carbon dioxide ($CO_2$), originating from a brewery, is purified and then used for the carbonation of the beverage produced or as an overgas to prevent the oxidation or the contamination of the beverage.

BACKGROUND OF THE INVENTION

In the brewing industry it is usual to use large quantities of carbon dioxide for producing or maintaining the carbonation of the brewed product, such as beer. Carbon dioxide is produced as a byproduct during the fermentation of the beer and for economic reasons it would be desirable to employ the carbon dioxide byproduct for the carbonation of the beer. However, the carbon dioxide byproduct is impure, often containing residual amounts of air, and it is necessary to purify the carbon dioxide before it can be used for carbonation or as an overgas. Thus in a brewing plant there is a demand for substantially pure gaseous carbon dioxide as a service to the beer producing process and there is also the concurrent production of carbon dioxide as a byproduct which must be purified.

In known brewing processes, the carbon dioxide byproduct, and the overgas which has been used to protect the brewed product from oxygen and contamination, are removed from the brewing plant and fed to an independent refrigeration circuit employing conventional refrigerating equipment. The carbon dioxide is then cooled and liquefied by the refrigerant in a known manner to produce substantially pure liquid carbon dioxide. The liquid carbon dioxide is then subsequently used to provide substantially pure gaseous carbon dioxide for use in the carbonation of the brewed product or as a substantially pure overgas.

In the conventional plant the production of substantially pure gaseous carbon dioxide from substantially pure liquid carbon dioxide is carried out in a first vessel by using energy from steam or electricity to evaporate the liquid carbon dioxide. The purification of the byproduct is carrid out in a separate second vessel, again using energy, by liquefying impure carbon dioxide to provide substantially pure liquid carbon dioxide. Each of those steps requires the input of energy and consequently the costs of running the plant are high.

Normally, in brewing plants the liquefaction of the impure byproduct is carried out on relatively pure feeds which have been pre-purified by purging impurities from the gases at the start of fermentation. There is a substantial loss of $CO_2$ from this purging.

The present invention relates to a process which can purify the carbon dioxide byproduct "on site" so that the purified gaseous carbon dioxide is ready for use in carbonation of the brewed product or for use as an overgas which employs less energy than the conventional brewing plant for the production of substantially pure gaseous carbon dioxide for use in the brewing plant, and which can be used to purify gaseous carbon dioxide containing relatively large amounts of impurities.

SUMMARY OF THE INVENTION

The present invention provides a process for producing substantially pure liquid carbon dioxide, and subsequently re-evaporating the substantially pure liquid carbon dioxide to produce substantially pure gaseous carbon dioxide, from impure carbon dioxide gas which is produced during the fermentation step of a brewing process or has been used as an overgas in a brewing plant. The substantially pure gaseous carbon dioxide is for use in carbonating the brewed product or as an overgas in the brewing plant. The process comprises the steps of:

(a) removing impure carbon dioxide gas from the brewing plant;

(b) pressurising the impure carbon dioxide gas;

(c) cooling the pressurized impure carbon dioxide gas so as to produce substantially pure pressurized liquid carbon dioxide and gaseous impurities;

(d) removing the gaseous impurities from the substantially pure pressurized liquid carbon dioxide;

(e) expanding the substantially pure pressurized liquid carbon dioxide thereby lowering its pressure and temperature and producing residual substantially pure liquid carbon dioxide and substantially pure gaseous carbon dioxide;

(f) evaporating the residual substantially pure liquid carbon dioxide to produce further substantially pure gaseous carbon dioxide, the evaporation step (f) and the cooling step (c) each at least partially being carried out in a respective one of two opposing sides of a heat exchanger such that evaporation of the residual substantially pure liquid carbon dioxide cools the pressurized impure carbon dioxide gas; and (g) feeding the substantially pure gaseous carbon dioxide produced in step (e) and/or in step (f) to the brewing plant.

The present invention further provides an apparatus for producing substantially pure liquid carbon dioxide, and subsequently re-evaporating the substantially pure liquid carbon dioxide to produce substantially pure gaseous carbon dioxide, from impure carbon dioxide gas which is produced during the fermentation step of a brewing process or has been used as an overgas in a brewing plant. The substantially pure gaseous carbon dioxide is for use in carbonating the brewed product or as an overgas in the brewing plant. The apparatus comprises means for removing impure carbon dioxide gas from the brewing plant, means for pressurizing the impure carbon dioxide gas, a heat exchanger having a first side in which the pressurized impure carbon dioxide gas is cooled so as to produce substantially pure pressurized liquid carbon dioxide and gaseous impurities, means for removing the gaseous impurities from the substantially pure pressurized liquid carbon dioxide, means for expanding the substantially pure pressurized liquid carbon dioxide thereby lowering its pressure and temperature and producing residual substantially pure liquid carbon dioxide and substantially pure gaseous carbon dioxide, means for introducing the residual substantially pure liquid carbon dioxide into a second side of the heat exchanger, means for removing the gaseous impurities from the substantially pure pressurized liquid carbon dioxide, means for expanding the substantially pure pressurized liquid carbon dioxide thereby lowering its temperature and pressure and producing residual substantially pure liquid carbon dioxide and substantially pure gaseous carbon dioxide, means for introducing the residual substantially pure liquid carbon dioxide into a second side of the heat exchanger in opposition to the first side and in which the residual substantially pure liquid carbon dioxide is evaporated to produce further substantially pure gaseous carbon dioxide, the arrangement being such that the evaporation of the residual substantially pure liquid carbon dioxide in the second side cools the pressurized impure carbon dioxide gas in the first side, and means for feeding the substantially pure gaseous carbon dioxide produced in the means for expanding and/or in the second side of the heat exchanger to the brewing plant.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Figure 1:
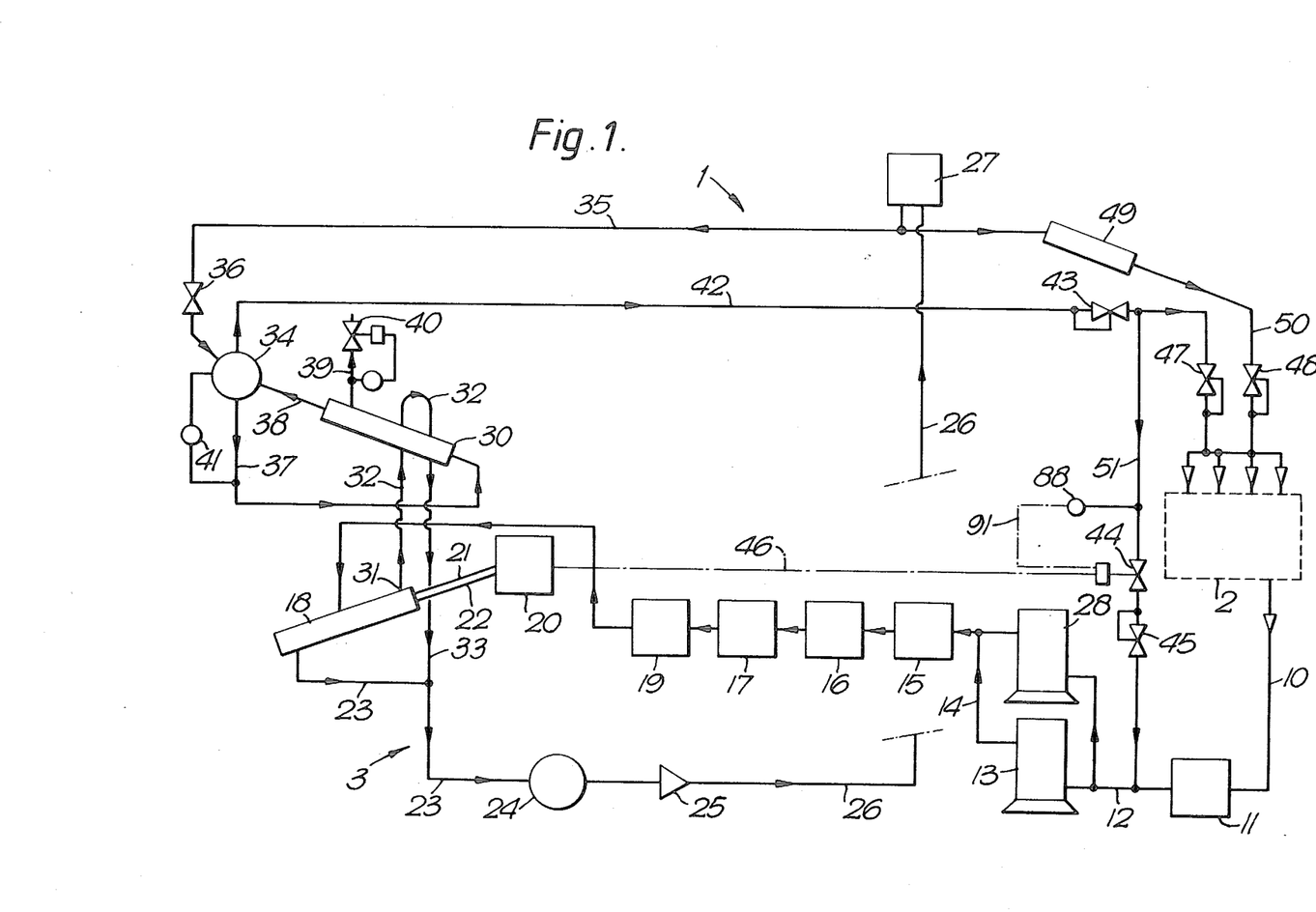
FIG. 1 is a schematic representation of a first embodiment of a $CO_2$ liquefaction plant for use in a process for purifying carbon dioxide according to the present invention.
Figure 3:
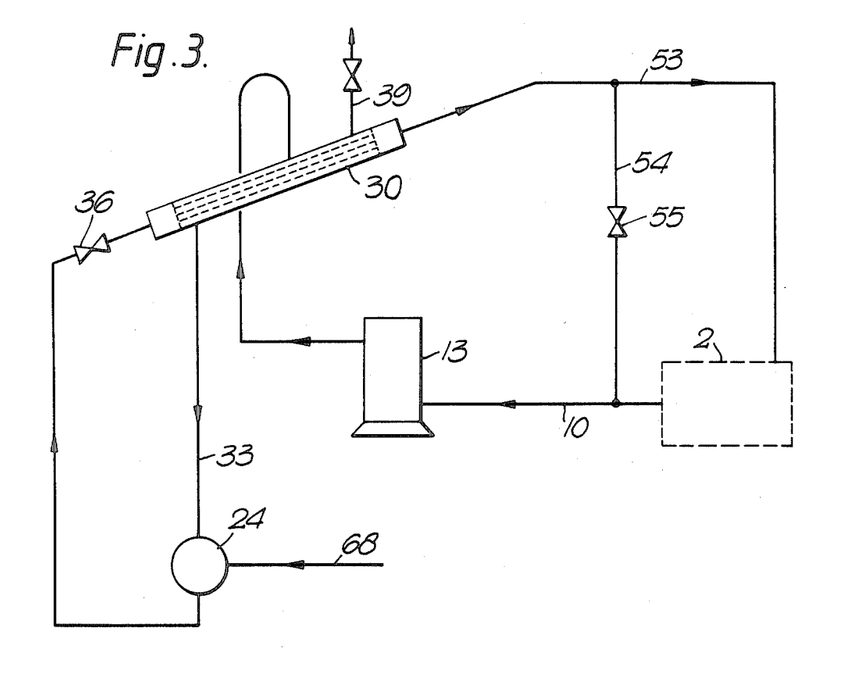
FIG. 3 is a schematic representation of a second embodiment of a stand-alone $CO_2$ liquefaction plant for use in a process for purifying carbon dioxide according to the present invention.

The apparatus of FIG. 1 incorporates an existing refrigerated liquefier while the apparatus of FIG. 3 is designed for use as a stand-alone plant. Both of these embodiments are capable of liquefying $CO_2$ in feed streams of purities from 100% ($CO_2$ by volume) to below 50% ($CO_2$ by volume) in air and certain other fluids. Addition of the stand-alone apparatus to an existing refrigerated liquefier allows the complete system to handle gas mixtures of the purities mentioned, at the same time reducing the specific power consumption of the plant and reducing the heat required for vaporization. Unless stated otherwise, all percentage purities referred to herein are percentage purities of $CO_2$ by volume as a gas.

The systems both use the refrigerating effect of a high pressure product from a liquid storage $CO_2$ tank when it is expanded for use on site or expanded for recompression, the expansion occurring on one side of a heat exchanger. Temperatures down to about 217 K. can be achieved by the expansion of the liquid, and this low temperature is used to cause $CO_2$ gas on the opposing side of the heat exchanger to be condensed to liquid $CO_2$; the low temperature ensures that virtually all the $CO_2$ is condensed.

Referring to FIG. 1, a brewing plant 1 for carrying out the process of the present invention incorporates a site 2 in which the brewed product is fermented, stored, packaged, etc. and a carbon dioxide liquefication and purification apparatus 3. The carbon dioxide liquefication and purification apparatus 3 removes impure $CO_2$ from the site 2, purifies it and then feeds substantially pure $CO_2$ back into the site 2.

In the carbon dioxide liquefication and purification apparatus 3, impure gaseous $CO_2$ from the site 10 is fed through a line 2 and is stored in a holder 11, from which it is fed through a line 12 to a compressor 13. The compressed impure gaseous $CO_2$ output from the compressor 13 is passed along a line 14 in turn through an aftercooler 15, a separator 16, an absorber 17, and a drier 19, each of these units being well known to a person skilled in the art, and thence to a main liquefier 18. The main liquefier 18 is supplied with a circulating refrigerant from a main refrigerating unit 20 over lines 21 and 22. In the main liquefier 18, a portion of the $CO_2$ content in the compressed gaseous impure $CO_2$ is liquefied and the liquid $CO_2$ produced is allowed to flow by gravity from the main liquifier 18 over a line 23 to a collecting tank 24, from which it is pumped by a pump 25 over a line 26 to a bulk storage tank 27. For clarity in FIG. 1 part of line 26 is omitted. The lower boiling point impurities, which are more volatile than $CO_2$, largely remain in the gaseous phase with the gaseous $CO_2$ which was not liquefied. Depending upon the circumstances, it may be necessary to supplement the compressor 13 by an additional compressor 28 in parallel with it, as shown in FIG. 1, to increase the pumping capacity of the apparatus.

To the extent thus described the apparatus of FIG. 1 could operate in a known manner, and the apparatus could be modified by the incorporation of other units in accordance with any requirements.

For purposes of the present invention, other supplementary equipment is associated with the apparatus described, and a major component of this supplementary equipment is an additional liquefier 30 which typically is a shell and tube heat exchanger. Impure gaseous $CO_2$, including lower boiling point gaseous impurities, which was not liquefied in the main liquefier, passes through an exit port 31 in the main liquefier 18, over a line 32, and into the shell side of the additional liquefier 30. In the additional liquefier 30, the input gaseous $CO_2$ is liquefied in a manner described below to produce substantially pure liquid $CO_2$. The substantially pure liquid $CO_2$ output of the additional liquefier 30 is passed over a line 33 to the line 23 so as to be combined with the liquid $CO_2$ output of the main liquefier 18 and thence over line 23 to the collecting tank 24, from which it is pumped to the main storage tank 27 as described above.

Lower boiling point gaseous impurities are removed from the shell side of the heat exchanger of the additional liquefier 30 via a purge outlet 39 which is provided with a control valve 40.

Liquefaction of the gaseous $CO_2$ in the shell of the additional liquefier 30 is effected by expansion and evaporation of substantially pure liquid $CO_2$ from the main storage tank 27 in the tube side of the additional liquefier 30. The substantially pure liquid $CO_2$ can be fed to the additional liquefier 30 by a direct connection from the main storage tank 27 to the input of the tube side of the additional liquefier 30 through a suitable expansion valve, but a preferred arrangement employs, as shown, a drum separator 34 to which substantially pure liquid CO₂ is fed from the main storage tank 27 over a line 35 and an expansion valve 36. Liquid $CO_2$ from the separator 34 is fed to the inlet of the tube side of the additional liquefier 30 over a line 37 and natural circulation causes the $CO_2$ to flow through the heat exchanger of the additional liquefier 30. In the tube side of the additional liquefier 30 the liquid $CO_2$ evaporates and expands and the resultant substantially pure gaseous $CO_2$ is returned to the separator 34 over a line 38. The separator 34 has a level control means 41 which operates to control the feed of liquid carbon dioxide into the separator 34 and thence to the additional liquefier 30. The substantially pure $CO_2$ gas is fed from the separator 34 to the site 2 over a line 42, through a control valve 43. The outlet of control valve 43 is also connected by a line 51 to the suction inlet of the compressor 13 through control valves 44 and 45. The control valve 44 is controlled from the main refrigerating unit 20 and a pressure switch 88, as indicated by the functional lines 46 and 91, so as to be open only when the main refrigerating unit 20 is in operation and also when the pressure in line 51 is above a predetermined threshold. The control valve 43 controls the pressure on the downstream side of the expansion valve 36.

In the apparatus described, two further control valves 47 and 48 are used. Control valve 47 is in the line 42 from the control valve 43 to the site 2, and control valve 48 is in a line 50 from tank 27, through a conventional vaporizer 49 and to the site 2. The two further control valves 47, 48 allow preference to be given to the supply of $CO_2$ to the site from the tank 27 or the separator 34 is required.

When the site 2 is shut down or has no requirement for producing gaseous $CO_2$, control valves 47 and 48 are both closed and control valves 43, 44 and 45 are opened so as to permit purified $CO_2$ to be fed back to the compressor 13 and retained within the system. Balance lines, not shown, are connected between both liquefiers 18 and 30 and both tanks 24 and 27.

Thus it will be seen that in accordance with the present invention, cooling and liquefaction of $CO_2$ gas is effected by the evaporation and expansion of substantially pure liquid $CO_2$, and this is in contrast to known processes which employ a specific refrigerant material in an independent refrigerant circuit. In the brewing plant the production of pure gaseous $CO_2$ and the purification of impure $CO_2$ by liquefaction are effected in one stage with the heat exchanger of the additional liquefier 30. The additional liquefier 30 is operated so that the conditions necessary for producing substantially pure gaseous $CO_2$ from liquid $CO_2$ are set up on one side of the heat exchanger and at the same time the conditions necessary for liquefying the impure gaseous $CO_2$ are set up on the other side of the heat exchanger.

The process of the present invention integrates the liquefaction of impure by-product with the vaporization of $CO_2$ liquid for use on the site. The use of $CO_2$ liquid as the refrigerant permits the achievement of a much lower liquefaction temperature than the conventional plant and in the absense of the operating costs required by an independent refrigeration circuit. The $CO_2$ being vaporized can be made colder than with the conventional plant which allows more $CO_2$ to be extracted from the feed stream. Since the method can purify relatively impure $CO_2$, the method is also tolerant to air which could cause a conventional plant to cease operation. To illustrate the nature of the advantages which can be obtained with the use of the present invention, the working conditions which exist in one particular example will be described with reference to FIG. 1.

In this example, the impure $CO_2$ gas delivered on line 14 to the input of the main liquefier 18 is at a pressure of 21.7 bar(a), 2.17 MPa(a) or 300 psig. By way of illustration, it will be assumed that this gas contains 90% $CO_2$ by volume and the remainder is non-condensible (in this equipment) gases (NC). In the main liquefier 18 some of the $CO_2$ is condensed and flows to the tank 24. The temperature at which this gas condenses can be calculated as follows:

| | |
|---|---|
| Inlet condition | = 21.7 bar(a), 30° C. |
| Pressure of $CO_2$ | = 90/100 × 21.7 bar(a) |
| | = 19.53 bar(a) |
| | = 1.953 MPa(a) |

From appropriate tables giving saturation temperatures, such as those in the ASHRAE 1981 Fundamentals Handbook,

| | |
|---|---|
| Temperature | = 253K |
| | = −20° C. |

Due to considerations of heat transfer in the main liquefier 18 and the presence of the non-condensible gases, the temperature of the mixed gases in the main liquefier will fall to about −26.1° C. To calculate the composition of the gas mixture at −26.1° C., 247 K., it can be ascertained from tables that the saturation pressure at this temperature will be 1.629 MPa(a). The total pressure of the mixture as delivered by the compressor is 2.17 MPa(a), so that the proportion of $CO_2$ at the exit of the main liquefier 18 is given by:

| | |
|---|---|
| $CO_2$ | = 1.629/2.17 × 100% |
| | = 74.7% |
| | = 75% |

The pressure of the 75% of $CO_2$ gas mixture leaving the main liquefier 18 and fed to the shell side of the additional liquefire 30 is still 2.17 MPa(a), and the pressure of the liquid fed from the bulk storage tank 27 to the input of the expansive valve 36 is also 2.17 MPa(a), due to the connection of the balance lines between the liquifiers 18 and 30 and the tanks 24 and 27. The liquid in the bulk storage tank 27 is saturated; from tables, the saturation temperature at 2.17 MPa(a) is approximately 256 K., −17° C.

The pressure of the liquid fed to the tube side of the additional liquefier 30 through the expansion valve 36 is 7.9 bar(a), 0.79 MPa(a), 100 psig; this pressure is controlled by the control valve 43. From tables, the temperature of saturated $CO_2$ at 0.79 MPa(a) is approximately 227 K., −46° C.

The conditions in additional liquefier 30 can now be tabulated as follows:

| | SHELL SIDE | TUBE SIDE |
|---|---|---|
| Total Pressure | 2.17 MPa(a) | 0.79 MPa(a) |
| Composition at Inlet | | |

|  | SHELL SIDE | TUBE SIDE |
| --- | --- | --- |
| $CO_2$ | 75% | 100% |
| NC | 25% | 0% |
| Pressure of $CO_2$ | 1.62 MPa(a) | 0.79 MPa(a) |
| Temperature | −26.1° C. | −46.0° C. |
| Saturated? | Yes | Yes |

Since the tube side, is colder than the shell side heat will flow to the tube side from the shell side, and this will cause the liquid $CO_2$ to boil off in the tubes. Simultaneously, the loss of heat from the shell side will cause cooling of the gas in the shell and condensation of $CO_2$, and the $CO_2$ liquid thus condensed is collected and runs under gravity into the liquid tank 24 through the liquid lines 33 and 23.

The substantially pure $CO_2$ that has been boiled off and passed to the separator drum 34 to separate any remaining droplets of liquid is discharged along line 42 and through the valves 43 and 47 to fulfill requirements on the site 2, or is passed back to be recompressed, through valves 43, 44 and 45. It is to be observed that the use of the additional liquifier 30 obviates the use of steam or electric power heating for this duty, though the demand for $CO_2$ on the site 2 can be supplemented by liquid from tank 27 being vaporized in vaporiser 49 and fed through valve 48 to the site 2.

There remain in the shell of the additional liquifier 30 non-condensable gases that have to be purged from the liquifier 30. As these gases more towards the purge outlet 39 they are continuously cooled by the very cold (−46° C.) tubes, and the gases reach a temperature of about −41° C. The composition of the gas mixture being purged from the shell can be calculated as follows:

| Total Pressure | = 2.17 MPa(a) |
| --- | --- |
| Temperature | = −41.0° C. |
|  | = 232K |

From tables, the saturation pressure at 232 K. is 0.96317 MPa(a) $CO_2$. The composition of the purge gas is then:

| 0.96317/2.17 × 100% | = 44.4% |
| --- | --- |
|  | ≅ 45% |

Thus, the purge gases contain only 45% $CO_2$. To relate this to the overall operation of the plant, in comparison with the conventional plant, the conventional liquefiers normally take a feed of about 99% pure $CO_2$ and urge at a purity of about 90%.

The reasons for this are the following:

a. As the purge purity is reduced so the condensation temperature of the $CO_2$ in the gas is reduced and then correspondingly the temperature and pressure of the evaporating refrigerant material reduces and as a result, the capacity of the conventional mechanical refrigeration plant falls. Typically, at a purge purity of 75% pure $CO_2$ the capacity of the conventional plant to condense and produce liquid $CO_2$ from a 90% pure $CO_2$ feedstream will have fallen to around three fifths of its nominal capacity on a 100% pure $CO_2$ feedstream.

b. As the purge purity is reduced there is dissolved in the liquid product a greater proportion of dissolved air. This is undesirable (particulrly oxygen) in brewing operations and most especially in $CO_2$ required for carbonation. As an option the supplemented plant (or the conventional plant) can be fitted with a purification column as described later and illustrated in FIG. 4.

Some data by way of example on the operation of the conventional plant and the plant using the additional liquefier 30 reveals the advantage to be obtained by the process of the invention. Three sets of conditions will be given: a first where the feed gas is 99% pure $CO_2$ and 1% non-condensible (NC) gas; the second where the feed gas is 95% pure $CO_2$ and 5% NC gas, and the third where the feed gas is 90% pure $CO_2$ and 10% NC gas. For each set of conditions the yield, from 100 units fed to then, of the conventional plant and of the plant using the additional liquefier 30, is given.

Condition I (99% pure feed)

(a) Conventional Plant: The liquid output of $CO_2$ will be 90 units. The purge output of 90% pure $CO_2$ will be 9 units of $CO_2$, with 1 unit of NC. The total $CO_2$ liquefied will be 90 units, from the input of 99 units, that is, 91% of the available $CO_2$ input.

(b) Supplemented Plant: The liquid output of $CO_2$ will be 98 units. The purge output of 45% pure $CO_2$ will be 1 unit of $CO_2$, with 1 unit of NC. The total $CO_2$ liquefied will be 98 units, from the input of 99 units, that is, 99% of the available $CO_2$ input.

Condition II (95% pure feed)

(a) Conventional Plant: The liquid output of $CO_2$ will be 50 units. The purge output of 90% pure $CO_2$ will be 45 units of $CO_2$, with 5 units of NC. The total $CO_2$ liquefied will be 50 units, from the input of 95 units, that is, 53% of the available $CO_2$ input.

(b) Supplemented Plant: The liquid output of $CO_2$ will be 91 units. The purge output of 45% pure $CO_2$ will be 4 units of $CO_2$, with 5 units of NC. The total $CO_2$ liquefied will be 91 units, from the input of 95 units, that is, 96% of the available $CO_2$.

Condition III (90% pure feed)

(a) Conventional Plant: The liquid output of $CO_2$ will be zero. The purge output of 90% pure $CO_2$ will be 90 units of $CO_2$, with 10 units of NC. The total $CO_2$ liquefied will be zero from the input of 90 units, that is, 0% of the available $CO_2$ input.

(b) Supplemented Plant: The liquid output of $CO_2$ will be 81 units. The purge output of 45% pure $CO_2$ will be 9 units of $CO_2$, with 10 units of NC. The total $CO_2$ liquefied will be 81 units, from the input of 90 units, that is, 90% of the available $CO_2$.

In general, the range of pressures of both the gas being condensed and the liquid being vaporized over which the invention can be used is from 5 bar(a), 0.5 MPa(a), (60 psig) to 74 bar(a), 7.4 MPa(a), (1060 psig). Preferably, the gas being condensed is at a pressure from 1.8 MPa(a), (250 psig) to 2.5 MPa(a), (350 psig). Preferably, the gas being vaporized is at a pressure from 0.65 MPa (a), (80 psig) to 1.15 MPa(a), (150 psig). The pressure of the liquid being vaporized is related to the pressure of the gas being condensed, by the requirement that there must be a temperature difference for the heat transfer to take place.

Figure 2:
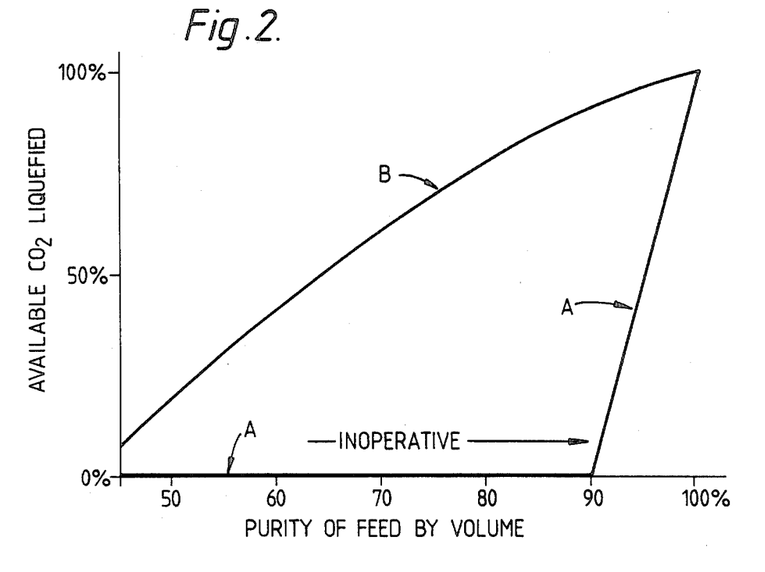
FIG. 2 is a graph showing the relationship between the proportion of available $CO_2$ liquefied and the purity of the impure $CO_2$ feed by volume, for a conventional brewing plant and for a brewing plant which employs the process of the present invention.

FIG. 2 is a graph showing the relationship between the percentage of the available $CO_2$ that is liquefied and the percentage purity of the gas feed to the liquefying system, for the conventional plant purging at 90% pure $CO_2$, Curve A, and the plant using the additional liquefier 30 purging at 45% pure $CO_2$, Curve B. It will be seen that the conventional plant produces no useful output of $CO_2$ where the feed purity is less than 90%, and between 90% and 100% purity gives the figures elaborated in the Examples above. By contrast, the system using the additional liquefier 30, in accordance with the present invention, gives a $CO_2$ output at wide levels of input feed purity, down to less than 50% $CO_2$, increasing steadily over the range, to a maximum at 100% purity.

The system described will thus be seen to have the advantages of operating at purity ranges of the input feed well below the ranges with which the conventional plant can contend, and of producing a greater proportion of liquefied $CO_2$ throughout the working range. The use of steam or equivalent power to vaporize $CO_2$ is obviated or reduced.

FIG. 3 is a diagram, similar to FIG. 1, showing a stand-alone plant for use in the process of the present invention and which does not employ a refrigerant unit thereby obviating the power requirements and cost of a main refrigerant unit. Parts of the system corresponding to those in FIG. 1 bear like reference numerals.

Low pressure impure $CO_2$ gas from the site 52 is fed through the line 10 to the compressor 13, and high pressure impure $CO_2$ gas is delivered from the compressor 13 to the shell side of the liquefier 30. High pressure substantially pure liquid $CO_2$ from tank 24, to which deliveries can be made over line 68, is fed to the tube side of the liquefier 30 through valve 36 as a medium pressure substantially pure liquid/gas mixture. High pressure substantially pure liquid $CO_2$ is returned to the tank 24 through the line 33 from the shell side of the liquefier 30, and the shell side of the liquefier 30 has a purge outlet 39 through which the non-condensible impurities are expelled. Medium pressure substantially pure $CO_2$ gas if fed from the tube side of the liquefier 30 to the site 2 through line 53, and there is a pressure let-down line 54 with a control valve 55 connecting line 53 with line 10. This system also has the main advantages described above in connection with the apparatus of FIG. 1.

It may occur that when carrying out liquefaction of $CO_2$ from feedstocks of low purity, the liquid $CO_2$ may contain an unacceptably or undesirably high proportion of dissolved air or other contaminants. In particular, when the feedstock contains 90% or less $CO_2$, it may be that the resultant product from the apparatus of FIG. 1 or 3 is not sufficiently pure for use in the brewing industry. An apparatus which can be used in such conditions for further purification of the liquid $CO_2$ by employing liquid stripping using re-boiled gas is illustrated schematically in FIG. 4. The apparatus shown in FIG. 4 is intended as an addition to the additional liquefier 30 shown in FIGS. 1 and 3; its use is optional, but it can be used when additional purification of the liquid $CO_2$ is requried.

Figure 4:
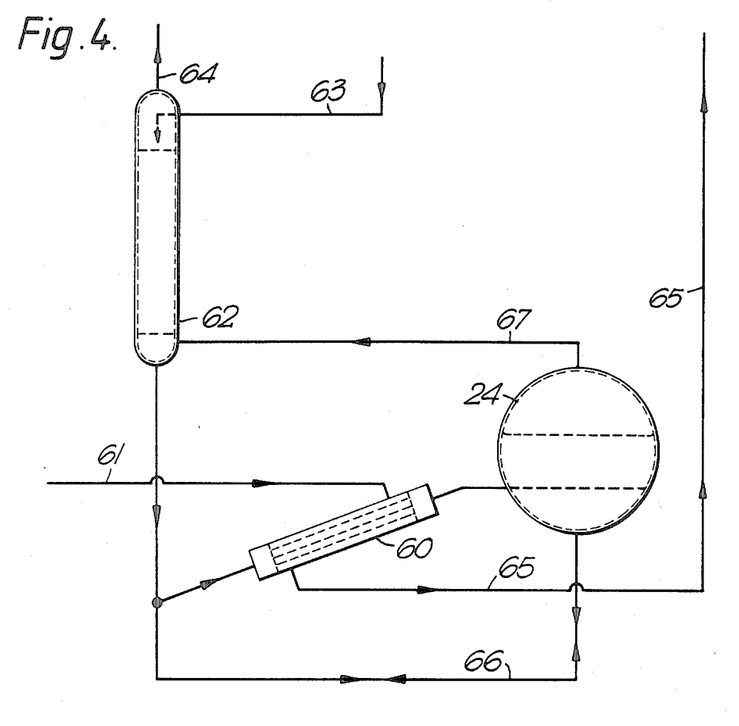
FIG. 4 is a schematic representation of an example of a further purification system which can be incorporated in the plant shown in FIG. 1 for use in the process of the present invention.

In the apparatus shown in FIG. 4, liquid $CO_2$ from the collecting tank 24, or from either of the liquefiers 18 or 30 of FIG. 1, is re-boiled in a re-boiler heat exchanger 60. The re-boiler heat exchanger 60 can be an independent unit, external to the tank 24, as shown, or it can be in the form of a coil submerged in the tank 24. The heat required to operate the re-boiler 60 can be from steam or electricity or, more efficiently and as shown, it can be derived from the desiccant drier or driers and/or the compressor or compressors by using the relatively warm pressurized impure $CO_2$ gas from those units, which is fed to the shell side of the heat exchanger 60 over line 61. This option does not require additional heat to be removed subsequently. The relatively warm gases are cooled in the re-boiling process and the cooled feedstock gas from the shell side of the heat exchanger 60 is fed over line 65 to the liquefiers 18 and 30.

Liquid $CO_2$ in tank 24 is passed along line 66 into the heat exchanger 60 and is re-boiled to form a re-boiled gas. The re-boiled gas exits the tubes of the heat exchanger 60 and is passed into the tank 24. The action of re-boiling some of the liquid $CO_2$ or passing re-boiled gas though the liquid $CO_2$ removes volatile impurities (e.g. oxygen and nitrogen) preferentially from it.

The re-boiled gas is then passed from tank 24 over a line 67 up a counter-current packed stripping column 62 where it encounters relatively impure liquid flowing by gravity down the stripping column 62, this liquid being fed from either or both of the liquefiers 18 or 30 over line 63. The relatively pure re-boiled gas removes impurities from the relatively impure liquid. The re-boiled gas from the stripping column 62 is fed over a line 64 to the liquefiers 18 and 30. The liquid in the stripping column 62 continues to fall by gravity down the stripping column 62 and then into the collecting tank 24 over line 66. The gas drawn into the liquefiers 18 and 30 over line 64 is condensed to $CO_2$ and the impurities are purged away to the atmosphere.

Figure 5:
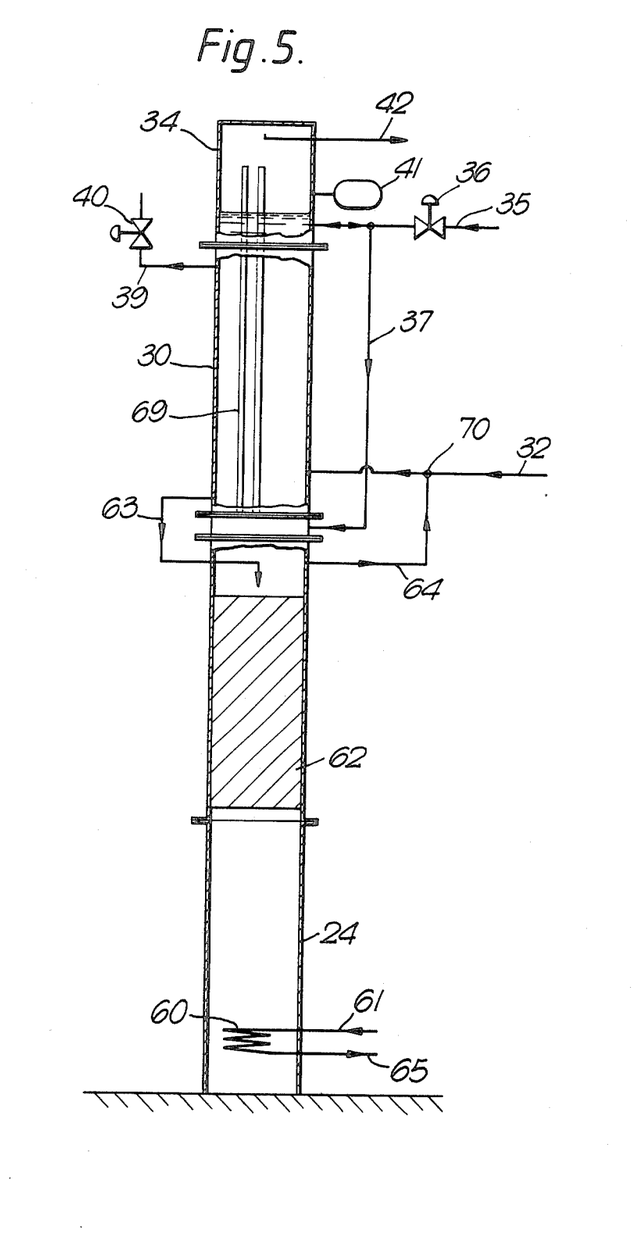
FIG. 5 is a schematic representation of an alternative example of a liquefier and purifier for use in the plant of FIG. 1 for use in the process of the present invention.

An alternative arrangement of supplementary equipment is illustrated in FIG. 5. The additional liquefier 30 and the separator 34, and possibly also (as illustrated in FIG. 5) the stripping column 62 and the tank 24 as well, can be formed into a self supporting column. The stripping column 62 is mounted above the tank 24 and the additional liquefier 30 and the separator 34 are mounted in turn above the stripping column 62. This arrangement offers the benefit of a reduced ground area requirement and in some cases lower equipment costs. Parts of the system corrresponding to those in FIGS. 1 and 4 bear like reference numerals.

High pressure impure $CO_2$ gas is fed over line 32 from the compressor(s) 13(28) to the shell side of the additional liquefier 30. High pressure substantially pure liquid $CO_2$ from storage tank 27 is fed over line 35, through valve 36 and then to the drum separator 34 as a medium pressure gas/liquid $CO_2$ mixture. Liquid $CO_2$ also passes from the valve 36 down line 37 and into the inlet of the tube side of the additional liquefier 30. In the tube side of the additional liquefier 30 the liquid $CO_2$ rises up the tubes 69 being partly vaporized by the $CO_2$ gas feed from line 32 in the shell side of the additional liquefier 30. The tubes 69 of the additional liquefier 30 exit in the drum separator 34 above the level of liquid $CO_2$ in the drum separator 34. The level of liquid is controlled by the level control means 41 for the separator 34.

Liquid $CO_2$ having been condensed in the shell side of the additional liquefier 30 is passed over line 63 into the packed stripping column 62 and thence falls by gravity into the tank 24. Liquid $CO_2$ in the tank 24 is re-boiled using heat exchanger 60 (which has input line 61 and output line 65 for the feedstock gas), and the re-boiled $CO_2$ gas passes up the column 62, out of the top of the column 62 and along line 64 which joins the gaseous feed line 32 at point 70. The combined gaseous $CO_2$ in line 32 is then passed into the liquefier 30 as described above. Non-condensible gases are purged from the top of the shell side of the liquefier 30 over line 39 under control of valve 40. Substantially pure $CO_2$ gas which is boiled off in the tube side of the liquefier 30 is passed from the drum separator 34 to the site 2 over line 42.

In some instances it may be desired to produce very high purity $CO_2$. This may be done by carrying out the purification process described above with the apparatus of FIG. 6. High pressure substantially pure liquid $CO_2$ feed from a tank such as 24 or 27 in FIG. 1 is fed along a line 71, through an expansion valve 72 which reduces the pressure to medium pressure and into a drum separator 73. The liquid $CO_2$ level in the drum separator 73 is maintained at a desired value by a level control device 74 which operates on the valve 72. Liquid $CO_2$ from drum separator 73 passes over a line 75 to the tube side of a heat exchanger 76 in which it is partially boiled and the resultant mixture of liquid and gaseous $CO_2$ is passed back to the drum separator 73 from the tube side of the heat exchanger 76. The medium pressure $CO_2$ gas is then passed over a line 77 to the suction side of a compressor 80. Excess $CO_2$ gas on line 77 is passed over a line 78 and a pressure control means 79 for use on the site. High pressure $CO_2$ gas from the output of the compressor 80 is passed through a conventional plant such as an aftercooler 81, a separator 82 and an absorber tower 89 and thence over a line 90 to the shell side of the heat exchanger 76. In the shell side of the heat exchanger 76 the input $CO_2$ gas touches the tubes in the heat exchanger 76 which are cooled by the liquid $CO_2$ boiling therein and very pure $CO_2$ liquid condenses out on the outside of the tubes and falls under gravity out of the shell side of the heat exchanger 76, over a line 83 and into a collecting tank 84. The resultant pure liquid $CO_2$ in tank 84 can be passed over a line 85 to be vaporized and piped for use in critical areas of the brewing process. The impurities remaining as a gas in the shell side of the heat exchanger 76 are expelled through a purge line 86 and are vented away through a valve 87.

Figure 6:
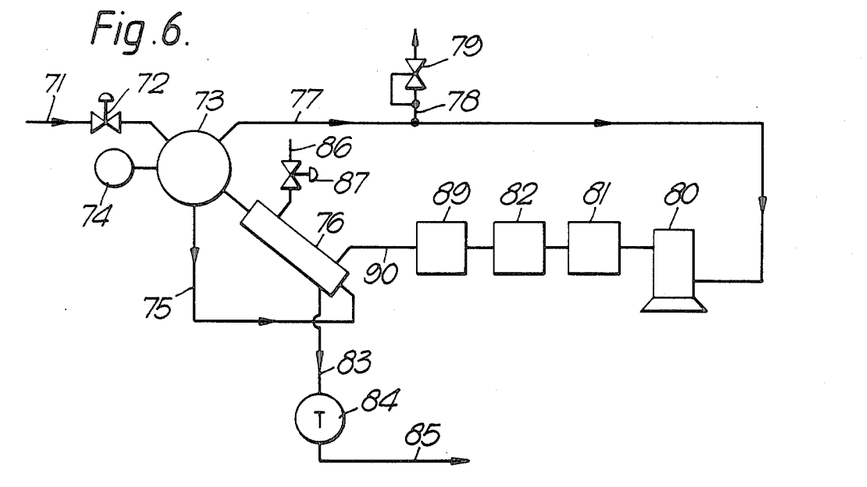
FIG. 6 is a schematic representation of an example of a $CO_2$ purification plant for producing very high purity liquid $CO_2$ from a substantially pure liquid $CO_2$ feedstream in accordance with the present invention.

There are other arrangements using similar apparatus that could repurify $CO_2$ using substantially pure $CO_2$ gas as a feedstream. Additionally, if desired, even greater purity can be achieved by interposing a stripping column (as is shown in FIG. 4) in line 83 (which is shown in FIG. 6) to strip any remaining impurities from the liquid $CO_2$.

The present invention can thus provide a method for purifying $CO_2$ that can increase the recovery yield of commercially pure liquid $CO_2$ from pure to impure $CO_2$ gas from fermentation and/or recovery processes without the energy requirement of a conventional refrigeration plant. In the method of the present invention, gaseous $CO_2$ for process use can be produced without requiring vaporization energy from, for example, steam or electricity as is required by conventional brewing plants.

Also, the method of the invention can liquefy pure or impure by-product $CO_2$ from the brewing process by vaporizing pure liquid $CO_2$ which is requied for use in the brewing process, whereby the power requirements of the liquefication plant are reduced to a minimum. In the preferred method liquid $CO_2$ is purified in a stripping column that rejects impurities to the purge system of the liquefier with a minimum loss of $CO_2$ gas and with no additional power or heat requirements and with no loss of liquefication capacity.

The method of the present invention can also produce commercially pure liquid $CO_2$ from gaseous $CO_2$ feed streams of lower $CO_2$ purity than conventional and commercially available liquefication plants can operate on. The present method can liquefy impure or pure $CO_2$ without mechaical or absorbtion-type refrigeration plants where the additional liquid $CO_2$ deliveries are used to balance the $CO_2$ requirements of the brewing process. When the method of the invention is carried out using the apparatus of FIG. 1, it can enhance a conventional vapor compression $CO_2$ liquefication plant to enable the plant to liquefy efficiently a low purity feedstock by addition of a $CO_2$ to $CO_2$ heat exchanger from which vaporized $CO_2$ can be piped to the site or re-cycled back for recompression and re-liquefication. Furthermore, the method can be used to obtain very high purity $CO_2$ gas or liquid by having two or more liquefication systems as described operating in series.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A process for producing substantially pure liquid carbon dioxide, and subsequently re-evaporating the substantially pure liquid carbon dioxide to produce substantially pure gaseous carbon dioxide, from impure carbon dioxide gas which is produced during the fermentation step of a brewing processor or which has been used as an overgas in a brewing plant, the substantially pure gaseous carbon dioxide being for use in carbonating the brewed product or as an overgas in the brewing plant, the process comprising the steps of:
   (a) removing impure carbon dioxide gas from the brewing plant;
   (b) pressurizing the impure carbon dioxide gas;
   (c) cooling the pressurized impure carbon dioxide gas so as to produce substantially pure pressurized liquid carbon dioxide and gaseous impurities;
   (d) removing the gaseous impurities from the substantially pure pressurized liquid carbon dioxide;
   (e) expanding the substantially pure pressurized liquid carbon dioxide thereby lowering its pressure and temperature and producing residual substantially pure liquid carbon dioxide and substantially pure gaseous carbon dioxide;
   (f) evaporating the residual substantially pure liquid carbon dioxide to produce additional substantially pure gaseous carbon dioxide, the evaporation step (f) and the cooling step (c) each at least partially being carried out in the respective one of two opposing sides of a heat exchanger such that evaporation of the residual substantially pure liquid carbon dioxide cools the pressurized impure carbon dioxide gas; and
   (g) feeding the substantially pure gaseous carbon dioxide produced in step (e) and/or in step (f) to the brewing plant.

2. The process according to claim 1, wherein the substantially pure gaseous carbon dioxide produced in evaporating step (f) is further purified by being selectively recycled through steps (b) to (f).

3. The process according to claim 1, wherein steps (b) to (f) are carried out in a first carbon dioxide purification plant and a second carbon dioxide purification plant, which is in series with the first carbon dioxide purification plant, and is arranged selectively to purify either the substantially pure gaseous carbon dioxide produced in step (e) and/or step (f) prior to or after feeding step (g) or the substantially pure pressurized liquid carbon dioxide produced in removing step (d).

4. The process according to claim 1, wherein the substantially pure pressurized liquid carbon dioxide resulting from removing step (d) passes through a stripping column in which it contacts substantially pure pressurized re-boiled carbon dioxide gas which removes impurities therefrom, the impurity-removed pressurized liquid carbon dioxide passes from the stripping column and is then partially re-boiled to produce said re-boiled carbon dioxide gas, at least part of that portion of the impurity-removed liquid carbon dioxide which is not re-boiled is expanded in the expanding step (e) and the impurity-containing re-boiled carbon dioxide gas is passed from the stripping column.

5. The process according to claim 4 wherein the heat required for re-boiling the substantially pure pressurized liquid carbon dioxide is derived from pre-cooling the pressurized impure carbon dioxide gas prior to cooling step (c).

6. The process according to claim 1, wherein prior to cooling step (c), the pressurized impure carbon dioxide gas produced in pressurizing step (b) is pre-cooled in a refrigerating apparatus so as to liquefy at least partially the carbon dioxide gas.

7. The process according to claim 6, wherein the substantially pure pressurized liquid carbon dioxide resulting from removing step (e) and/or from the refrigerating apparatus passes through a stripping column in which it contacts substantially pure pressurized re-boiled carbon dioxide gas which removes impurities therefrom, the impurity-removed pressurized liquid carbon dioxide passes from the stripping column and is then partially re-boiled to produce said re-boiled carbon dioxide gas, at least part of that portion of the impurity-removed liquid carbon dioxide which is not re-boiled is expanded in expanding step (e) and the impurity-containing re-boiled carbon dioxide gas is passed from the stripping column.

8. The process according to claim 7, wherein the heat required for re-boiling the substantially pure pressurized liquid carbon dioxide is derived from pre-cooling the pressurized impure carbon dioxide gas prior to cooling step (c).

9. An apparatus for producing substantially pure liquid carbon dioxide, and subsequently re-evaporating the substantially pure liquid carbon dioxide to produce substantially pure gaseous carbon dioxide, from impure carbon dioxide gas which is produced during the fermentation step of a brewing process or which has been used as an overgas in a brewing plant, the substantially pure gaseous carbon dioxide being for use in carbonating the brewed product or as an overgas in the brewing plant, the apparatus comprising:

means for removing impure carbon dioxide gas from the brewing plant;

means for pressurizing the impure carbon dioxide gas;

a heat exchanger having a first side in which the pressurized impure carbon dioxide gas is cooled so as to produce substantially pure pressurized liquid carbon dioxide and gaseous impurities;

means for removing the gaseous impurities from the substantially pure pressurized liquid carbon dioxide;

means for expanding the substantially pure pressurized liquid carbon dioxide thereby lowering its pressure and temperature and producing residual substantially pure liquid carbon dioxide and substantially pure gaseous carbon dioxide;

means for introducing the residual substantially pure liquid carbon dioxide into a second side of the heat exchanger opposite the first side and in which the residual substantially pure liquid carbon dioxide is evaporated to produce additional substantially pure gaseous carbon dioxide, the arrangement being such that the evaporation of the residual substantially pure liquid carbon dioxide in the second side cools the pressurized impure carbon dioxide gas in the first side; and means for feeding the substantially pure gaseous carbon dioxide produced in the means for expanding and/or in the second side of the heat exchanger to the brewing plant.

10. The apparatus according to claim 9, further comprising a stripping column through which is passed the substantially pure pressurized liquid carbon dioxide from the means for removing so as to contact therein substantially pure pressurized re-boiled carbon dioxide gas which remove impurities therefrom;

means for passing the impurity-removed pressurized liquid carbon dioxide to a re-boiler in which it is partially re-boiled so as to produce said re-boiled carbon dioxide gas;

a second means for passing at least part of that portion of the impurity-removed liquid carbon dioxide which is not re-boiled to the means for expanding; and a second means for removing the impurity-containing re-boiled carbon dioxide gas from the stripping column.

11. The apparatus according to claim 9 further comprising means for recycling the substantially pure gaseous carbon dioxide output from the heat exchanger to the means for pressurizing.

12. The apparatus according to claim 9, further comprising a second carbon dioxide purification apparatus which receives a portion of the substantially pure pressurized liquid carbon dioxide output of the heat exchanger and outputs further-purified carbon dioxide in liquid form, the second carbon dioxide purification apparatus comprising a second means for expanding the substantially pure pressurized liquid carbon dioxide thereby lowering its temperature and pressure to produce residual substantially pure liquid carbon dioxide and substantially pure gaseous carbon dioxide;

a second means for introducing the residual substantially pure liquid carbon dioxide into a first side of a second heat exchanger in which it is at least partially evaporated to produce substantially pure gaseous carbon dioxide;

a second means for pressurizing part of the substantially pure gaseous carbon dioxide produced in the second means for expanding and/or the second heat exchanger;

a second means for feeding that portion of said substantially pure gaseous carbon dioxide not pressurized in the second means for pressurizing to the brewing plant;

a third means for introducing the pressurized substantially pure gaseous carbon dioxide into a second side of the second heat exchanger in opposition to the first side and wherein the evaporation of the residual substantially pure liquid carbon dioxide in the first side of the second heat exchanger cools the pressurized substantially pure gaseous carbon dioxide in the second side of the second heat exchanger so as to produce further-purified liquid carbon dioxide and gaseous impurities;

a third means for removing the gaseous impurities from the further-purified liquid carbon dioxide; and a third means for feeding the further-purified liquid carbon dioxide from the second side of the second heat exchanger.

13. The apparatus according to claim 9, further comprising a refrigerating apparatus wherein, prior to being fed to the heat exchanger, the pressurized impure carbon dioxide gas from the means for pressurizing is pre-cooled so as to liquefy at least partially the carbon dioxide gas.

14. The apparatus accordng to claim 13, further comprising a stripping column through which is passed the substantially pure pressurized liquid carbon dioxide from the means for removing and/or from the refrigerating apparatus so as to contact therein substantially pure pressurized re-boiled carbon dioxide gas which removes impurities therefrom;

means for passing the impurity-removed pressurized liquid carbon dioxide to a re-boiler in which it is partially re-boiled so as to produce said re-boiled carbon dioxide gas;

a second means for passing at least part of that portion of the impurity-removed liquid carbon dioxide which is not re-boiled to the means for expanding; and a second means for removing the impurity-containing re-boiled carbon dioxide gas from the stripping column.

* * * * *

UNITED STATES PATENT AND TRADEMARK OFFICE
CERTIFICATE OF CORRECTION

PATENT NO. : 4,699,642
DATED : Oct. 13, 1987
INVENTOR(S) : Perry et al.

It is certified that error appears in the above-identified patent and that said Letters Patent is hereby corrected as shown below:

ON THE TITLE PAGE:

In the category "[73] Assignee:" change "Kims Developments Limited" to --Kins Developments Limited--.

IN THE CLAIMS:

Claim 1

Line 6, change "processor" to --process--.

Signed and Sealed this

Second Day of August, 1988

Attest:

DONALD J. QUIGG

Attesting Officer

Commissioner of Patents and Trademarks